United States Patent [19]

Aoki et al.

[11] E Re. 28,645

[45] Reissued Dec. 9, 1975

[54] METHOD OF HEAT-TREATING LOW TEMPERATURE TOUGH STEEL

[75] Inventors: Koichi Aoki, Yokohama; Seinosuke Yano, Kamakura; Hiroshi Mimura; Tohru Inoue, both of Tokyo; Hiroshi Sakurai, Kawasaki, all of Japan

[73] Assignee: Nippon Steel Corporation, Tokyo, Japan

[22] Filed: Nov. 5, 1973

[21] Appl. No.: 412,625

Related U.S. Patent Documents

Reissue of:

[64] Patent No.: 3,619,302
Issued: Nov. 9, 1971
Appl. No.: 776,421
Filed: Nov. 18, 1968

[52] U.S. Cl. ..... 148/12 F; 148/12.4; 148/134; 148/143

[51] Int. Cl. ..... C21d 1/26; C21d 7/14

[58] Field of Search ..... 148/12 F, 12.4, 134, 143; 75/123

[56] References Cited

UNITED STATES PATENTS

| | | | |
|---|---|---|---|
| 2,532,117 | 11/1950 | Newell | 148/134 |
| 2,664,369 | 12/1953 | Kiefer, Jr. | 148/134 |
| 2,679,454 | 5/1954 | Offenhauer | 148/134 |
| 2,797,162 | 6/1957 | Korczynsky | 148/134 |
| 2,992,148 | 7/1961 | Yeo et al. | 148/134 |
| 3,135,600 | 6/1964 | Hardwick et al. | 148/134 |
| 3,249,426 | 5/1966 | Nakamura | 148/143 |
| 3,266,947 | 8/1966 | Steiner | 148/12 |
| 3,444,011 | 5/1969 | Nagashima et al. | 148/31 |

*Primary Examiner*—W. Stallard
*Attorney, Agent, or Firm*—Toren, McGeady and Stanger

[57] ABSTRACT

[ Heat ] *In the disclosed heat*-treating method of hot-rolled steel plate containing *less than 0.20% of C, 0.05 to 0.40% of Si, 0.10 to 5.0% of Mn and 1.50 to 10.0% of Ni* [ 1.5% to 10.0% Ni and 0.1% to 5.0% Mn and further at least one element selected from the group consisting of Mo, Cu, Cr, Nb and V, at need and ] *with* the balance being substantially Fe, [ comprising subjecting one or more time repeatedly said ] *the* hot-rolled steel plate [ to heating ] *is heated to* [ and sequent quenching from ] a temperature [ within ] *between* the [ range between ] $Ac_1$ and $Ac_3$ *transformation* points *and then cooled, whereafter* [ , then subjecting ] the steel plate *is subjected* to tempering treatment at a temperature below *the* $Ac_1$ point *but sufficiently high so as to cause precipitation or formation of fine austenite*, thereby to improve [ largely ] toughness at low temperature and *to* obtain excellent workability.

8 Claims, 12 Drawing Figures

METHOD OF HEAT-TREATING LOW TEMPERATURE TOUGH STEEL

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a heat-treating method for imparting *to a low carbon tough steel containing 1.5 to 10.0% by weight of Ni and 0.1 to 5.0% by weight Mn* a very high toughness at low temperature, particularly at such an extremely low temperature as −196°C, the boiling point of liquid nitrogen, and an excellent workability, particularly low yield ratio at room temperature [to a low carbon tough steel containing 1.5 to 10.0 wt.% Ni and 0.1 to 5.0 wt.% Mn].

2. Description of the Prior Art

It is well known that recently a 9%-Ni steel *has been developed which* is widely used as a steel material for use at low temperature. This 9%-Ni steel is usually [made] *manufactured into* a finished product after *having been* subjected to hardening and tempering treatments, or to normalizing and tempering treatments, after a solid solution treatment. The thus treated product shows a relatively good toughness at low temperature, but [it does not always follow that a] satisfactory results can *not always* be obtained in case an optimum toughness, superior to the above-mentioned, is required.

As regards [to] workability, no particularly excellent result could be obtained according to the experiments made by the inventors of the present invention.

Further, a 6%-Ni series low temperature tough steel has been developed by the inventors of the present invention as a low temperature tough steel which should take the place of the 9%-Ni steel [, and]. For this new steel U.S. Pat. No. 3,388,988 was granted. By subsequent investigations, however, it was discovered that in order to obtain an optimum toughness, a tempering treatment must be carried out under the optimum conditions of a relatively narrow range, which [make a knotty point in the operation] *is cumbersome from an operational point of view*. Also as regards the workability, the optimal result could *still* not [still] be secured with the 6%-Ni steel, as [in] *is* the case [of] *with* the 9%-Ni steel.

[Now, as seen from examples of 6%-Ni and 9-Ni steels, in general, with] *When* a usual heat treatment [which is to be] *is* carried out *with 6%-Ni and 9%-Ni steels* for obtaining a high toughness, the yield ratio becomes high, but a steel having a high yield ratio is [used to be detested by a] *not favored by* construction designers from the view point of safety. As is explained in the following, the present invention [is to] provides a heat-treating method, by which a steel having a high toughness can be obtained in [the] *a* wide [range of a] tempering temperature *range*, while keeping the yield ratio low by utilizing a segregation.

SUMMARY OF THE INVENTION

The present invention [is to] eliminates the above-mentioned defects of Ni-containing steels. Therefore, the primary object of the present invention is to provide an excellent tough steel which [is by far] *has significantly* improved [in the] toughness *characteristics*, by causing [an] *a* Ni-containing steel to form a fine structure according to a method [mentioned] *explained* in the following, without causing thereby a reduction in [a] strength at low temperature.

The second object of the present invention is to impart an excellent workability, particularly a [property of] low yield ratio, to [an] *a* Ni-containing tough steel.

Another object of the present invention is to provide a tempering treatment [of an] *for a* Ni-containing steel with the optimum conditions [of] *in a* wide [r] range.

Still other objects of the present invention will become manifest by the following description [s] with reference to the examples and accompanying drawings.

The present invention, which is to attain the above mentioned objects, provides the method, wherein a hot-rolled steel plate containing 1.5 to 10.0% Ni, 0.1 to 5.0% Mn, and Si in an amount as required for making steel (preferably 0.05 to 0.4%) and further *containing* at least one element [properly] selected from the group consisting of 0.05 to 1.0% Mo (a part or the whole of Mo may be replaced by W), 0.10 to 2.0% Cu 0.10 to 1.50% Cr, less than 0.05% sol, Al, less than 0.2% Nb, less than 0.2% V, less than 0.1% Zr, less than 0.1% Ti, less than 0.005% B, as *the* occasion demands and the balance being Fe and unavoidable impurities, is heated to a temperature above the $Ac_3$ transformation point [and] *is* then cooled with a cooling rate greater than [a] *obtained by air* cooling [by air] and thereafter is heated to a temperature between the $Ac_1$ transformation point and the $Ac_3$ transformation point and *is* then cooled (with a cooling rate greater than [a] *obtained by air* cooling [by air]) [and then] *whereupon* the thus treated steel plate is further subjected to a tempering treatment at a temperature below the $Ac_1$ transformation point [,] ; or the hot-rolled steel material may be directly heated to and quenched from a temperature between the $Ac_1$ transformation point and the $Ac_3$ transformation point [and then] *whereupon* the thus treated steel plate is subjected to a tempering treatment at *a* temperature below the $Ac_1$ transformation point. Further, prior to the heating and cooling to and from a temperature above the $Ac_3$ transformation point or to and from a temperature between the $Ac_1$ transformation point and the $Ac_3$ transformation point, a solid solution treatment may be carried out.

DESCRIPTION OF THE PREFERRED EMBODIMENT

Figure 1:
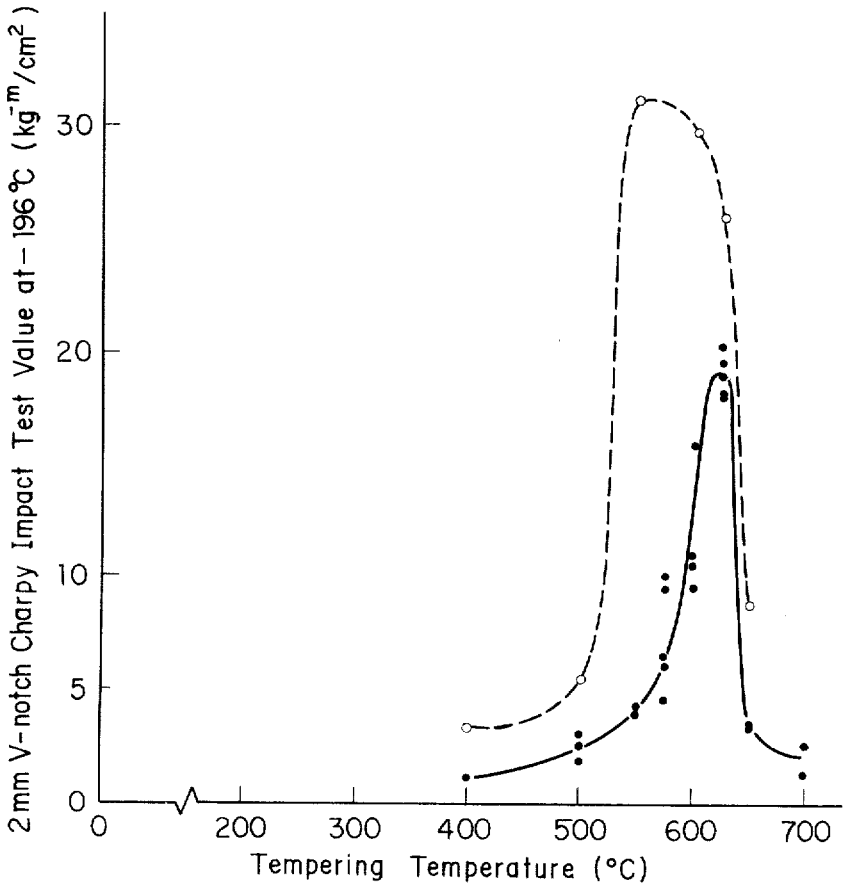
FIG. 1 is a diagram showing the relation between [a] tempering temperature and [a] toughness of a 6%-Ni series steel treated according to the method of the present invention, as compared with that of a 6%-Ni series steel treated according to a conventional method, i.e., quenched and tempered.

The essential feature of the present invention resides producing a structure consisting of a fine ferrite and npered martensite, wherein a stable ultrafine austen- or cementite is precipitated, by subjecting a hotled steel plate containing necessary elements in the ıges as above mentioned or a steel plate obtained by ɜdening or air-cooling the hot-rolled steel plate, to ɜcial heating and cooling treatments to and from a nperature between the $Ac_1$ transformation point and $Ac_3$ transformation point and thereupon subjecting thus treated steel plate to a tempering treatment, ich enables the steel to display an excellent toughɜs at a very low temperature.

[It was manifested by the] *The* investigations made the inventors of the present invention *demonstrated* t a relatively good toughness could be displayed ɜn at low temperature, when a tough steel containing in a relatively great amount, as a 9%-Ni steel or a -Ni steel, was subjected to hardening and tempering atments. However, it was further discovered that, if a hot-rolled steel plate having the composition as above mentioned was subjected to a heat treatment specified by the present invention, that is heating to a temperature within a range between the $Ac_1$ transformation point and the $Ac_3$ transformation point and sequent quenching or air-cooling from the said temperature, [there could be obtained such an] excellent toughness at low temperature and workability [as was never seen at any] *values were obtained which were far superior to those displayed by the* conventional Ni-containing steels, *such* as 9%-Ni steel or 6%-Ni steel [,] . [whereby the application of] *The inventive* steel [for use] *is therefore particularly suitable for use* at low temperature [was widely spread]. Further, as such a remarkable improvement in the toughness at low temperature as above mentioned could be obtained without adding new alloy elements, that is, with a steel having the composition in the same or even [smaller] *narrower* ranges as the conventional 9%-Ni steel or 6%-Ni steel, a very economical production of an excellent tough steel for use at low temperature was made possible.

In the process of manufacturing the steel of the present invention, [a] melting may be carried out in any well known steel-making furnace such as converter, open-hearth furnace, electric furnace, high frequency furnace and the like. There is no problem [in the point] *in respect* of melting. A molten steel prepared by melting in any of the said furnaces is regulated in its composition by adding alloy elements as required and is made to a hot-rolled steel plate through the steps of ingotting, slabbing and hot-rolling. Then, the thus obtained hot-rolled steel plate is heat-treated as specified by the present invention.

The starting material [of] *for performing* the present invention is a hot-rolled steel plate as above mentioned. In the present invention, the hot-rolled steel plate may be immediately subjected to the special heat-treatment of the present invention (a solid solution treatment may be carried out prior to this special heat-treatment) or, [as another method] *in another embodiment*, the hot-rolled steel plate may be heated at first to a temperature above the $Ac_3$ transformation point but below the crystal grain coarsening temperature, with or without the solid solution treatment to be carried out prior to this heat-treatment. In this case, it is not desirable to heat the steel plate to a temperature above the crystal grain coarsening temperature, because the toughness of the steel will be deteriorated thereby. This heating is followed by [a] cooling rate greater than [an] *obtained by* air-cooling, that is, quenching, or by [an] air-cooling. The structure of the steel after this treatment [becomes] *is that of* a martensite structure or a mixed structure of martensite and bainite (or a mixed structure of martensite, bainite and ferrite according to circumstances).

The steel plate as hot-rolled or further subjected to the heat-treatment to a temperature above the $Ac_3$ transformation point and sequent quenching or air-cooling as above mentioned, is further successively heated to a temperature in the range between the $Ac_1$ transformation point and the $Ac_3$ transformation point and sequently quenched or air-cooled.

The essential feature of the present invention is just this special heat-treatment, that is, a heating to a temperature between the $Ac_1$ transformation point and the $Ac_3$ transformation point and sequent cooling from the said temperature. By this heat-treatment a fine structure of the steel is produced, whereby the toughness as well as the workability of the steel can largely be improved without reducing the strength thereof at low temperature. That is, when the above-mentioned steel plate as hot-rolled or further subjected to the heat-treatment to a temperature above the $Ac_3$ transformation point and sequent quenching or air-cooling, is further successively heated to a temperature in the range between the $Ac_1$ transformation point and the $Ac_3$ transformation point, a fine austenite, enriched in C, Ni, Mn and N, present as an impurity, is precipitated *or formed* in an insular form at an old martensite crystal grain boundary, old austenite crystal grain boundary or ferrite subgrain boundary. [ with the help of an effect of accelerating the ] *The precipitation or formation of the fine austenite is facilitated by the effect of accelerated* diffusion caused by the presence of a great number of dislocation groups in the quenched or air-cooled structure which is a result [ed from ] *of* the previous treatment [, ]. [ and this ] *This* austenite is equilibrated with well annealed and fine ferrite having an excellent toughness, resulting in the formation of a mixed structure of [ them ] *fine austenite and fine ferrite.* In the present invention it is an indispensable condition that the mixed structure of austenite and ferrite is produced by the heating to a temperature between the $Ac_1$ transformation point and the $Ac_3$ transformation point. The most preferable range in the above-mentioned heating to a temperature between the $Ac_1$ transformation point is 620° to 800°C. [ in the case of ] *if* the steel [ having ] *has* the composition range as above mentioned. Through the sequent quenching or air-cooling, a mixed structure of ferrite and fine insular martensite can be obtained. The quenching or air-cooling from the above-mentioned temperature range may be carried out once or may be repeated several times. By repeating the said treatment several times the martensite structure is further refined, whereby the toughness of the refined steel is all the more improved. The medium for use in the quenching may be water, oil, mist or any other *medium* which [can perform] *causes* a compulsory cooling. There is no particular limitation in the medium to be selected.

The thus heat-treated steel plate is then tempered at a temperature below the $Ac_1$ transformation point, preferably in the range of 450° to 600°C. By this tempering treatment, austenite is again dispersedly precipitated *or formed* in a very fine form in the fine martensite islands, and there is finally produced a mixed structure of a pure ferrite *which is the result* of [resulted from ] the advanced tempering, a tempered martensite and an extremely fine temper-formed *or reverted* austenite, whereby the toughness of *the* steel at lower temperature is largely improved, without causing [ the ] reduction of the strength.

However, in the case of the steel containing Ni in a small amount, for instance, less than 4.0 percent and less than 3.5 percent Mn, and the sum of Ni and Mn being less than 4.5 percent, there is found no appearance of the temper-formed *or reverted* austenite, but *instead* the precipitation of fine cementite in the above-mentioned islands of tempered martensite. The ferrite matrix is also purified, on account of the tempering being well advanced, and becomes a structure [ rich in the ] *which also exhibits great* toughness. [ too ].

In the following there will be briefly explained the reason [ of having limited ] *for limiting* the amounts of *the* alloy elements to be contained in the steel of the present invention.

C is effective [ on ] *for* improving the hardenability and further elevating the stability of austenite at low temperature, as *it is* being absorbed into the austenite precipitated during the tempering treatment. However, if the C content is too [ much ] *high, the* amount of solid solution carbon in the ferrite matrix will increase, which impairs not only the toughness, but also the weldability of steel. Therefore, the C content [ was ] *is* limited to less than 0.2 percent.

Si is an element necessary for steelmaking and is usually contained in an amount of more than 0.05 percent. However, if *it* exceeds 0.4 percent, there [ appears the ] *is a* tendency [ of the ] *that the* toughness [ being deteriorated ] *of the steel may deteriorate.*

It is well known that Ni is a useful element for improving the toughness and strength of steel. Further, it serves to stabilize the temper-formed *or reverted* austenite at low temperature, as *it is* being absorbed into austenite during the tempering treatment. However, if *too much* Ni is added [ too much ], [ it ] *the steel* becomes expensive. Therefore, the upper limit thereof [ was ] *is* limited to 10.0 percent. On the other hand, if [ it ] *the Ni content* is less than 1.5 percent, the structure which is the object to be attained by the present invention can not be obtained. Therefore, it is necessary to *provide a steel which* contains Ni in an amount of at least more than 1.5 percent [ , ]; [ and ] and the preferable range is 4.5 to 9 percent.

Mn [ serves to ] not only improves the hardenability, but also, like Ni and N, stabilizes [ a ] *the* very fine austenite precipitated *or formed* during the tempering treatment and [ elevated ] *increases* the toughness and strength of the ferrite matrix. However, if [ it ] *too much Mn* is contained [ too much ] *in the steel*, it stabilizes carbide up to a considerably high temperature. Consequently, the upper limit [ thereof was ] *for Mn is* limited to 5.0 percent. Further, Mn is useful as an element which can replace Ni. Therefore, the range [ of adding ] *for the* Mn *addition* is to be properly decided [ depending ] *in dependence* on the Ni content. For instance, if Ni is contained in a range of 4.0 to 7.5 percent, it is [ preferably ] *preferable* to [ contain ] *add* Mn in an amount of more than 0.9 percent. But [ , ] in case Cu is added, the lower limit of Mn can be extended to 0.5 percent. On the other hand, in case the Ni content is less than 4.0 percent, there is a possibility of austenite being precipitated *or formed*, if Mn is added in *a* relatively large amount, that is, more than 1.0 percent. But [ , ] in [ this ] *the latter* case, that is, in the case of the Ni content being less than 4.0 percent, there is almost precipitated cementite, if the sum of Ni and Mn is less than 4.5 percent. Therefore, in adding Mn, the above-mentioned conditions must be taken into consideration in order to obtain the desired structure. Further, in case Ni is contained in a large amount, Mn may be added in a small amount. [ At least with 0.1% Mn, the ] *The* object of the present invention can be achieved *with at least 0.1% Mn.* Therefore, the lower limit of Mn [ was decided to ] *is set at* 0.1 percent.

Mo has *the* effect [ s ] of extending the optimum tempering temperature to the higher side, *of* refining the distributed states of temper-formed *or reverted* austenite grains and *of* promoting the diffusion of Mn, C and N. The addition of Mo is also effective to prevent temper embrittlement. For this purpose Mo must be added in a range of 0.05 to 1.0 percent. The same effect can also be achieved, [even] when a part or the whole of Mo is replaced by W.

Cu may be added, as the occasion demands, in order to improve the corrosion resisting property and the toughness of the steel. Like Ni and Mn, also Cu is thought to be effective [on] *for* stabilizing the temper-formed austenite and *for* strengthening some *of the* solid solution ferrite matrix [itself] proper. For this purpose [it] *Cu* may be added in an amount of less than 2 percent.

Cr is added, as *the* occasion demands, in order to improve the strength of *the* steel. Further, it is useful for extending the optimum tempering temperature to the higher side. It is necessary to be added in an amount of 0.1 to 1.5 percent.

Al is necessary to fix nitrogen contained in *the* steel as an impurity, besides being added as a deoxidizer. Al may be replaced by at least one of other nitride-forming elements such as Be, Nb, V and Ta and the like. If the Al content is, however, too [much] *high*, the impact property *of the steel* at low temperature [of steel] is [deteriorated] *impaired*. Therefore, *the* Al [was] *content is* limited to 0.05 percent in the form of acid-soluble [one] *Al*.

Further, in the present invention at least one element selected from the group consisting of less than 0.20% V, less than 0.2% Nb, less than 0.1% Zr, less than 0.1% Ti and less than 0.005% B *may be present* for the purpose of [particularly] imparting [the] strength to *the* steel and *for* promoting the effect of refining crystal grains.

In the following the examples of the present invention shall be [shown] *described*.

Table 1

HEAT TREATMENTS AND MECHANICAL PROPERTIES OF 6% Ni SERIES STEELS

Chemical composition (wt. percent)

| Steel No. | C | Si | Mn | Ni | Mo | Sol. Al | Other element | Plate thickness, mm |
|---|---|---|---|---|---|---|---|---|
| 6A | 0.07 | 0.23 | 1.70 | 6.0 | 0.20 | [0.15] *0.015* | Balance Fe. | 12 |
| 6B | 0.07 | 0.23 | 1.70 | 6.0 | 0.20 | [0.15] *0.015* | do | 12 |
| 6C | 0.07 | 0.23 | 1.70 | 6.0 | 0.20 | [0.15] *0.015* | do | 12 |
| 6D | 0.07 | 0.23 | 1.70 | 6.0 | 0.20 | [0.15] *0.015* | do | 12 |
| 6E | 0.07 | 0.23 | 1.70 | 6.0 | 0.20 | [0.15] *0.015* | do | 12 |
| 6F | 0.07 | 0.23 | 1.70 | 6.0 | 0.20 | [0.15] *0.015* | do | 12 |
| 6G | 0.07 | 0.23 | 1.70 | 6.0 | 0.20 | [0.15] *0.015* | do | 12 |
| 6H' | 0.07 | 0.23 | 1.70 | 6.0 | 0.20 | [0.015] *0.015* | do | 12 |
| 6I | 0.09 | 0.23 | 1.10 | 5.94 | 0.21 | 0.01 | do | 13 |
| 6J | 0.09 | 0.23 | 1.10 | 5.94 | 0.21 | 0.01 | do | 13 |
| 6K | 0.09 | 0.23 | 1.10 | 5.94 | 0.21 | 0.01 | do | 13 |
| 6L' | 0.09 | 0.23 | 1.10 | 5.94 | 0.21 | 0.01 | do | 13 |
| 6M' | 0.09 | 0.23 | 1.10 | 5.94 | 0.21 | 0.01 | do | 13 |
| 6N' | 0.09 | 0.23 | 1.10 | 5.94 | 0.21 | 0.01 | do | 13 |
| 6O | 0.064 | 0.11 | 0.52 | 6.30 | 0.22 | 0.01 | Cu 0.84; balance Fe. | 13 |
| 6P' | 0.064 | 0.11 | 0.52 | 6.30 | 0.22 | 0.01 | do | 13 |
| 6Q | 0.10 | 0.23 | 1.70 | 6.0 | 0.20 | 0.01 | Nb 0.05; balance Fe. | 13 |
| 6R' | 0.10 | 0.23 | 1.70 | 6.0 | 0.20 | 0.01 | do | 13 |

Heat treatment

| Steel No. | Q | L | T |
|---|---|---|---|
| 6A | | 700°C. × 60 mm. WQ | 550°C. × 60 mm WQ |
| 6B | | *do* | 600°C. × 60 mm WQ |
| 6 C | 800°C. × 60 mm. AC. | 670°C. × 60 mm. WQ | 500°C. × 60 mm WQ |
| 6D | do. | do | 550°C. × 60 mm WQ |
| 6 E | do. | do | 600°C. × 60 mm WQ |
| 6 F | do. | do | 625°C. × 60 mm WQ |
| 6 G | do. | do | 650°C. × 60 mm WQ |
| 6 H' | do. | [do] - | 600°C. × 60 mm WQ |
| 6 I | do. | *670°C. × 60 mm. WQ* | 500°C. × 60 mm WQ |
| 6 J | do. | do | 600°C. × 60 mm WQ |
| 6 K | do. | do | 625°C. × 60 mm WQ |
| 6 L' | do. | [do] - | 500°C. × 60 mm WQ |
| 6 M' | do. | [do] - | 600°C. × 60 mm WQ |
| 6 N' | do. | [do] - | 625°C. × 60 mm WQ |
| 6 O | 800°C. × 60 mm. WQ | *670°C. × 60 mm. WQ* | 600°C. × 60 mm WQ |
| 6 P' | do. | [do] - | do. |
| 6 Q | 800°C. × 60 mm. AC. | 640°C. × 20 [mm] *hr.* WQ | do. |
| 6 R' | do. | - | 625°C. × 60 mm WQ |

Mechanical property

| Steel No. | σy, kg./mm² | σB, kg./mm² | Y.R. (σy/σB) percent | Total elongation percent | Elongation Uniform elongation percent | vE-196°C kg.m/cm² | Hv |
|---|---|---|---|---|---|---|---|
| 6 A | | | | | | 25.5 | |
| 6 B | | | | | | 26.2 | |
| 6 C | 77.9 | 89.9 | 0.87 | 24.2 | 12.5 | 5.75 | |
| 6 D | 71.7 | 83.6 | 0.86 | 28.4 | 15.1 | 31.3 | |
| 6 E | 69.9 | 81.4 | 0.86 | 29.8 | 15.3 | 29.8 | |
| 6 F | 56.4 | 87.4 | 0.64 | 31.9 | 20.1 | 26.0 | |
| 6 G | 57.0 | 98.5 | 0.58 | 26.0 | 15.3 | 9.0 | |
| 6 H' | 69.6 | 77.8 | 0.96 | 24.9 | 10.8 | 13.0 | |
| 6 I | 70.7 | 82.9 | 0.85 | 24.2 | 13.8 | 24.4 | |
| 6 J | 65.6 | 76.7 | 0.86 | 27.4 | 16.4 | 27.1 | |
| 6 K | [55.2] *56.2* | 80.2 | 0.70 | 29.9 | 22.3 | 23.8 | |

Table 1-continued

| Steel No. | σy, kg./mm² | σB, kg./mm² | Y.R. (σy/σB) percent | Total elongation percent | Elongation Uniform elongation percent | $vE_{-196°C}$ kg.m/cm² | Hv |
|---|---|---|---|---|---|---|---|
| 6 L[1] | 79.5 | 84.2 | 0.94 | 20.5 | 7.6 | 6.5 | |
| 6 M[1] | 69.4 | 76.5 | 0.91 | 26.4 | 14.6 | 18.8 | |
| 6 N[1] | 63.3 | 75.1 | 0.84 | 26.0 | 15.6 | 26.1 | |
| 6 O | | | | | | 22.5 | 236 |
| 6 P[1] | | | | | | 10.0 | 250 |
| 6 Q | | | | | | 17.5 | 297 |
| 6 R[1] | | | | | | 12.3 | 278 |

[1]Steels treated according to conventional methods

Remarks: Heat treatment: Q means a treatment of heating and cooling to and from a temperature above the $Ac_3$ transformation point; L means a treatment of heating and cooling to and from a temperature [below the $Ac_1$ transformation point] *between the $Ac_1$ transformation point and the $Ac_3$ transformation point*; T means a tempering treatment at a temperature below the $Ac_1$ transformation point; °C. is temperature, mm is heating time (minute), WQ is quenching by water, and AC is cooling by air. Mechanical property: σY is Yield stress; σB is Tensile strength; Y.R. (σY/σB) is Yield ratio; $vE_{-196°C}$ is V-notch Charpy impact test value-196°C.; Hv is Vickers hardness. *Hr is heating time (hour).*

EXAMPLE 1

In table 1 there are shown mechanical properties of about 6% Ni-containing steels, subjected to the heat treatment of the present invention. All *the* samples consist [ing] of steel plates having a prescribed thickness [respectively], as [are] shown in table 1, *and* have been prepared according to *a* conventional melting process, ingotting, slabbing and hot-rolling.

Among them, the samples Nos. 6A and 6B are steels which contain 6% Ni and 1.7% Mn. [and are] *These samples were* obtained by directly subjecting a hot-rolled steel to the L-treatment (the treatment of heating and cooling to and from a temperature between the $Ac_1$ transformation point and the $Ac_3$ transformation point). The L-treatment is followed by the T-treatment (tempering at a temperature below the $Ac_1$ transformation point). In the case of the sample No. 6A the tempering temperature was 550°C. and in the case of the sample No. 6B 600°C. Both samples show an excellent toughness at low temperature. [respectively].

The sample Nos. 6C to 6G are those obtained by subjecting a hot rolled steel plate to the Q-treatment at 800°C. for 1 hour (the treatment of heating to and cooling from a temperature above the $Ac_3$ transformation point) followed by the L-treatment at 670°C. and thereafter by the T-treatment at 500° to 650°C. respectively. The sample No. 6H is a reference steel, which was not subjected to the L-treatment. Concerning mechanical properties of each sample of No. 6C to 6G treated according to the method of the present invention, there are shown excellent values for the toughness at low temperature in spite of a variety of tempering temperature. The reference steel No. 6H shows only a value less than [a] *one* half of that of the sample No. 6E of the present invention, even though the sample No. 6H was subjected to the T-treatment under the same conditions as the sample No. 6E. From this comparison the above mentioned *advantages* will be easily understood. Further, by the application of the method of the present invention, the range of tempering temperature can be largely widened. In FIG. 1 there are shown the relations between the impact value and tempering temperature on steels of the above-mentioned samples Nos. 6C to 6G (shown by a O mark) as compared with steels treated according to conventional methods, in which the L-treatment was omitted (shown by a O mark). As is evidently seen from this figure, according to the treating method of the present invention, a tempering treatment for obtaining high impact values can be carried out extending over a far wider range, as above mentioned, whereby [a] *the* difficulty in the producing process *to the effect* that the tempering treatment must be carried under much narrower conditions, as was heretofore *the case*, can be eliminated. Moreover, the samples Nos. 6C to 6G show a very low yield ratio respectively, which is particularly manifest in contrast to the sample 6H. It can [be], therefore, *be* concluded from the foregoing that steels treated by the method of the present invention are superior in the workability [to] *as compared to that of* conventional steels.

The samples Nos. 6I to 6N show the results [of] *with heat-treated* steels having the Mn content reduced to 1.10 percent, [being heat-treated], [wherein] *of which* the samples Nos. 6I to 6K are those *which were* treated according to the method of the present invention, while the samples Nos. 6L to 6N are those treated according to *a* conventional method. The comparison of both groups shows clearly the [quite] *substantially* same tendency with respect to the toughness at low temperature and the workability of steel as is seen [at] *in* the comparison of the samples Nos. 6C to 6G with No. 6H. The samples Nos. 6O and 6P are steels, which contain Cu, and show that the high toughness at low temperature can be obtained, even though the Mn content is reduced to about 0.5 percent, if the steel is treated according to the method of the present invention (for instance, No. 6O). [At last] *Finally*, the samples Nos. 6Q and 6R are steels, wherein Nb is added. In this case too, an excellent toughness at low temperature can be imparted to steel, if it is heat-treated according to the method of the present invention (for instance No. 6Q).

As above mentioned, in the steels subjected to the heat treatment of the present invention the toughness at low temperature is remarkably improved and further the workability is [elevated] *increased*, as the yield stress is reduced, that is, the yield ratio is lowered, while there is seen no change in the tensile strength. Usually, in [the said] *such* steels which contain [s] a relatively large amount of Mn, exceeding 1.0 percent and [is further] have, *moreover*, *a* high [in the] Mo content, cementite remains [till] *up* to the high temperature side [at the time of] *during* tempering, whereby the toughness is impaired. [In this case, if] *If* the tempering is *therefore* carried out at a high temperature in order to prevent the above-mentioned phe- ›menon, the temper-formed austenite becomes unsta- e [, ] on cooling, resulting in a deterioration of the ughness. [ thereby ] . However, if the steel is treated cording to the method of the present invention, aus- nite is precipitated *in* very fine *form* and dispersedly the steel and, in addition thereto, the structure is ry stable, whereby an excellent toughness at low tem- rature can be obtained. Further, [ as reasons of im- oving the toughness of steel there can be enumerated e following facts that ] by the heat treatment of the esent invention, the tempered structure becomes fine d the ferrite matrix [ becomes a ] *is rendered* pure one ] as a result of the tempering thereof being well ogressed. *There are reasons for the improvement of e toughness of the steels.*

Figure 3:
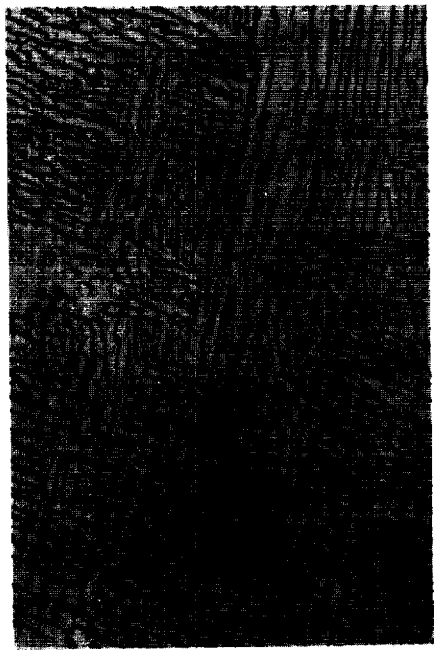
FIG. 3 is a photograph showing a structure by the observation with an electron microscope of a magnification of 4,500 of [in the case where] the steel of FIG. 2 [is] *after having been* further heated and sequently ɔled to and from 670°C.
Figure 2:
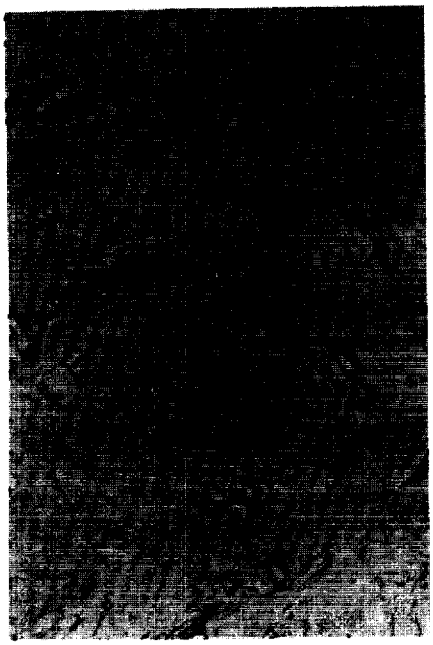
FIG. 2 is a photograph showing a structure by the observation with an electron microscope of a magnification of 4,500 of a 6%-Ni series hot-rolled steel plate as heated to 800°C. (above the $Ac_3$ transformation point) and cooled therefrom.
Figure 4:
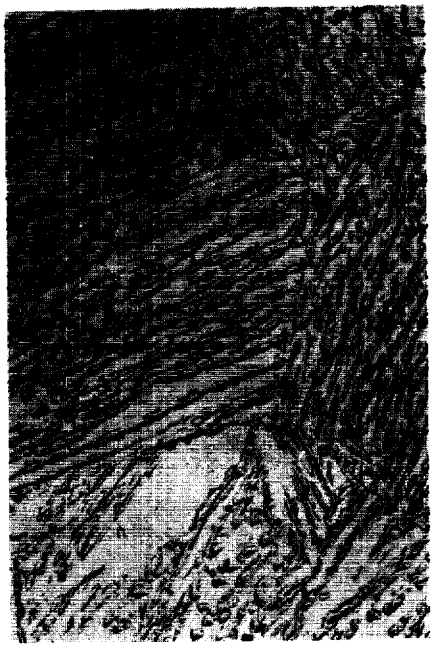
FIG. 4 is a photograph showing a structure by the obrvation with an electron microscope of a magnificaɔn of 4,500 of [in the case where] the steel plate of G. 3 [is] *which has been* further subjected to a temring treatment at 600°C.

In the following the structures of steels heat-treated cording to the present invention shall be explained in ference to the attached figures (photograph). The nples and the treating methods applied correspond the above-mentioned samples Nos. 6E and 6H. All ures show microphotographs of 4,500 magnifica- ›ns. [ respectively ] . FIG. 2 shows a sample sub- :ted to the following heat treatment: a heating to 0°C. for 1 hour with a sequent air cooling there- ›m [,] . [ wherein it ] *It* is [ evidently seen ] *'arly seen* that the structure consists of martensite and rtly bainite. FIG. 3 is a photograph showing a struc- ·e obtained by further subjecting the steel having the ucture as shown in FIG. 2 to the L-treatment of heat- ; to 560°C. for 1 hour and a sequent water cooling. ›m this photograph it is clear that as a result of the :reatment there is produced a structure, wherein ı ] martensite transformed from precipitated *or re- ·tedly formed* austenite enriched in C, Ni, Mn and N d precipitated finely in an insular form at an old mar- ısite subgrain boundary, is equilibrated with ferrite, *ıs* forming a mixed structure of them. The most im- rtant feature of the present invention lies just in pro- cing the above-mentioned structure. When the steel ·ing the structure as above mentioned is further sub- ted to the T-treatment of heating the steel to 600°C. 1 hour with a sequent water cooling, there is dis- :sedly precipitated *or formed* an ultrafine austenite in : tempered martensite, as shown in FIG. 4.

Figure 5:
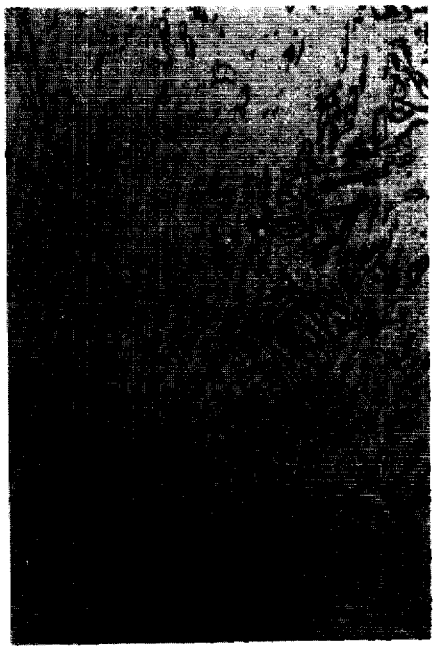
FIG. 5 is a photograph showing a structure by the obrvation with an electron microscope of a magnificaɔn of 4,500 of [in the case where] the steel plate of G. 2 *which* is directly subjected to a tempering treatɜnt at 600°C.

This will be more clearly observed, when compared h the structure of the reference sample shown in 3. 5. [ That is, ] FIG. 5 *thus* shows a structure of the el treated according to a conventional method, wherein the Q-treated steel of FIG. 2 was directly subjected to the T-treatment at 600°C., resulting in the production of a coarse*ly* precipitated *or formed* austenite.

EXAMPLE 2

Figure 6:
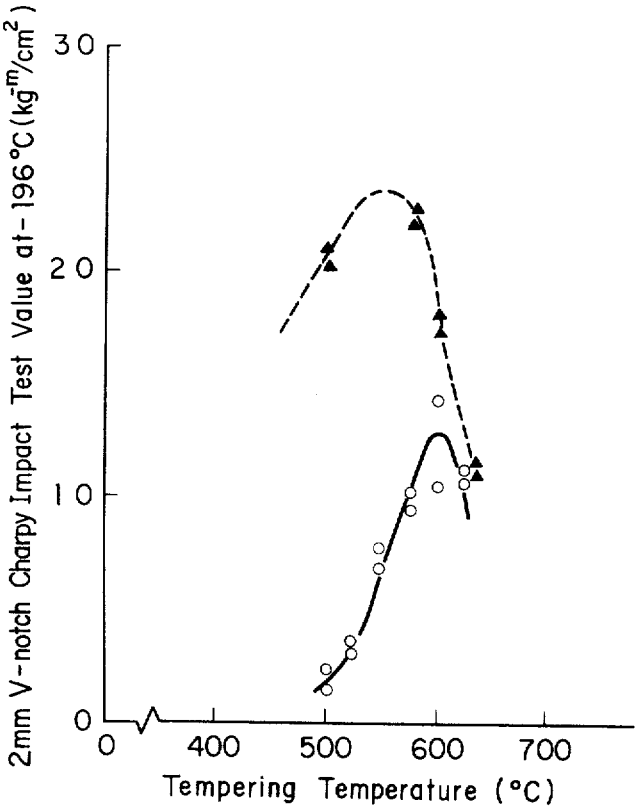
FIG. 6 is a diagram showing the relation between a] tempering and [a] toughness of a 9%-Ni series ɜel treated according to the method of the present inntion, as compared with that of a 9%-Ni series steel ɜated according to a conventional method.

In table 2 there are shown the heat-treating methods [ of ] *for* 9% Ni-containing hot-rolled steel plates and *the* mechanical properties obtained thereby, wherein the sample No. 9B is a steel treated according to a conventional method, that is, *the steel is* not subjected to the L-treatment. From the comparison with the sample 9A of the present invention it is clearly seen that the sample No. 9B [ is ] *has a* far lower [ in the ] toughness at low temperature than the sample No. 9A and also in [ the ] *respect of* workability *is* inferior to the latter, as is shown by a higher yield ratio. Further, from FIG. 6 [ showing ] *which shows* the relations between impact value and tempering temperature [ on ] *of* the steel [ shown by the ] *of* sample No. 9B, as compared with the steel treated according to the method of the present invention (*see black triangle mark*), it is seen that in the case of the reference steel (shown by a ○ mark) the range of proper T-treatment, that is, the range of tempering temperature capable of obtaining high impact value is very narrow, while in the case of the steel of the present invention the said range is far wider, indicating that an excellent toughness can be obtained in the *a* wide range of tempering temperature.

TABLE 2

9%-Ni SERIES STEELS

| Steel Nos. | Chemical composition (wt. percent) C | Si | Mn | Ni | Mo | Sol. Al | Other element | Plate thickness. mm. | Heat treatment Q | L | T |
|---|---|---|---|---|---|---|---|---|---|---|---|
| A | 0.04 | 0.25 | 0.43 | 9.05 | — | 0.01 | Balance Fe | 13 | 800° C.×60 mm. AC | 670° C.×60 mm. WQ | 575° C.×60 mm. W |
| B[1] | 0.04 | 0.25 | 0.43 | 9.06 | — | 0.01 | Balance Fe | 13 | 800° C×60 mm. PQ | | |

| Steel Nos. | Mechanical property $\sigma Y$, kg/mm² | $\sigma B$, kg./mm² | Y.R. ($\sigma Y/\sigma B$) | Elongation Total elongation, percent | Uniform elongation, percent | $vE_{-196°C}$, kg.m/cm² |
|---|---|---|---|---|---|---|
| 9A | 63.2 | 73.1 | 0.87 | 30.0 | 13.4 | 20.5 |
| 9B[1] | 70.0 | 75.3 | 0.93 | 24.4 | 10.5 | 7.9 |

*ıee Table 1*
*Remarks: PQ is pressure quench*
*)ther signs are of the same meaning as in Table 1*

Figure 8:
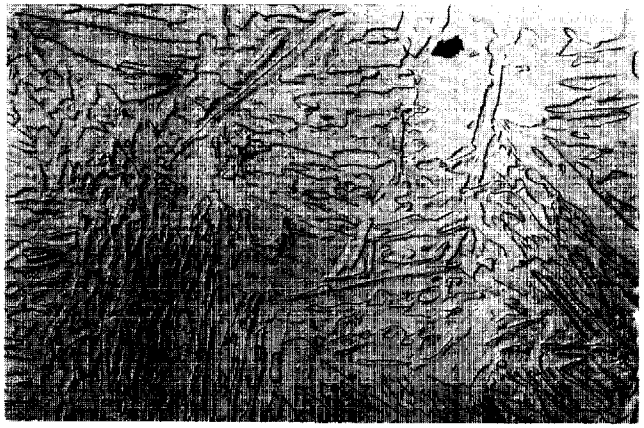
FIG. 8 is a photograph showing a structure by the obɜvation with an electron microscope of a magnificaɔn of 4,500 of [in the case where] the steel plate of G. 7 [is] *after having been* further heated to 670°C. d sequently cooled therefrom.
Figure 9:
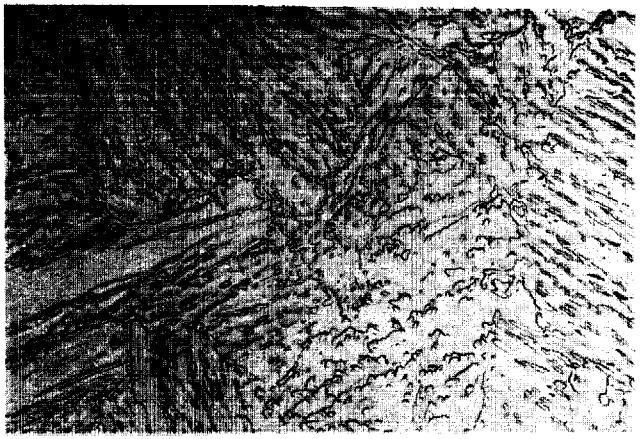
FIG. 9 is a photograph showing a structure by the obɜvation with an electron microscope of a magnificaɔn of 4,500 *of* [in the case where] the steel plate of G. 8 [is] *which is* subjected to a tempering treatɜnt at 575°C.
Figure 7:
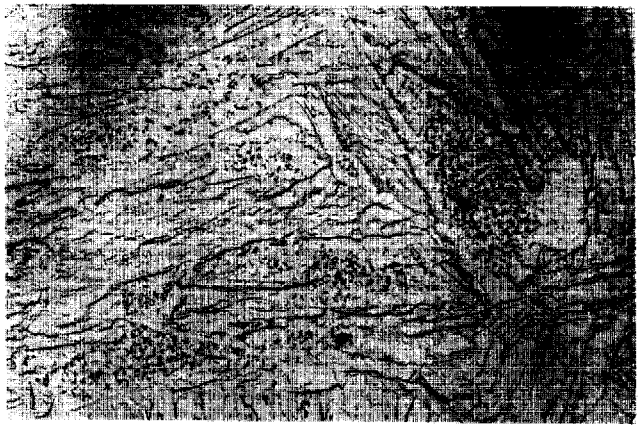
FIG. 7 is a photograph showing a structure by the obɜvation with an electron microscope of a magnificaɔn of 4,500 of a 9%-Ni series hot-rolled steel plate as ated to 800°C. and cooled therefrom.
Figure 10:
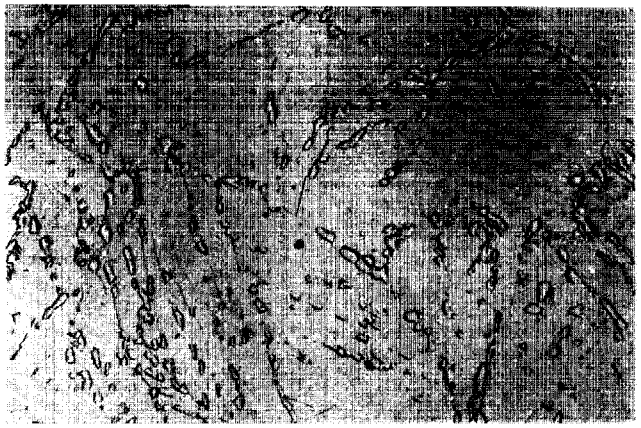
FIG. 10 is a photograph showing a structure by the servation with [must be] *an* electron microscope a magnification of 4,500 [in the case where] *of* the el plate of FIG. 7 *which has been directly heated* [to ɜctly 6] to 575°C. and sequently cooled therefrom.

The structures of steels subjected to various heat-treating methods in the present example are [ as ] shown by microphotograph of 4,500 magnifications in FIGS. 7 to 10. [ respectively ] . FIG. 7 is a microphotograph showing the structure obtained by the Q-treatment. From this photograph it is seen that the structure [ of ] *in* this case consists of a mixed structure of martensite and partly bainite. FIG. 8 shows the structure obtained by subjecting the steel having the structure shown in FIG. 7 to the L-treatment [, wherein ] . It is clearly seen that fine martensite in the insular form is precipitated *or formed* in the ferrite matrix. When further subjecting the sample of FIG. 8 to the T-treatment, there can be obtained a structure *as* shown by the photograph in FIG. 9, wherein the tempered martensite is formed in the ferrite matrix, where the tempering made progress, in said tempered martensite ultra fine austenite being precipitated *or formed*. For the purpose of comparison there is shown in FIG.

10 the final structure of sample No. 9B, which was not subjected to the L-treatment. From this figure it is quite evident that the temper formed *or reverted* austenite has a coarse structure, as compared with the structure shown in FIG. 9.

TABLE 3

3%-Ni SERIES STEELS

| Steel No. | Chemical composition (wt. percent) C | Si | Mn | Ni | Mo | Sol. Al | Other element | Plate thickness, mm. | Heat treatment Q | L | T |
|---|---|---|---|---|---|---|---|---|---|---|---|
| 3 A | 0.10 | 0.24 | 0.69 | 3.03 | | 0.36 | Balance Fe. | 11 | 900°C.×60 mm. WQ | 720°C.×00 mm. WQ | 500°C.×60 mm. WQ |
| 3 B | 0.10 | 0.24 | 0.69 | 3.03 | | 0.36 | do. | 11 | do. | do. | 550°C.×60 mm. WQ |
| 3 C | 0.10 | 0.24 | 0.69 | 3.03 | | 0.36 | do. | 11 | do. | do. | 600°C.×60 mm. WQ |
| 3 D[1] | 0.10 | 0.24 | 0.69 | 3.03 | | 0.36 | do. | 11 | 900°C.×00 mm. WQ | | 500°C.×60 mm. WQ |
| 3 E[1] | 0.10 | 0.24 | 0.69 | 3.03 | | 0.36 | do. | 11 | do. | | 600°C.×60 mm. WQ |
| 3 F | 0.045 | 0.21 | 4.45 | 2.95 | 0.21 | 0.015 | do. | 11 | 800°C.×00 mm. WQ | 670°C.×60 mm. WQ | do. |
| 3 G | 0.045 | 0.21 | 4.45 | 2.95 | 0.21 | 0.015 | do. | 11 | do. | 700°C.×60 mm. WQ | do. |
| 3 H[1] | 0.045 | 0.21 | 4.45 | 2.95 | 0.21 | 0.015 | do. | 11 | do. | | do. |

| Steel No. | Mechanical property vTrs (°C.) | Hv |
|---|---|---|
| 3 A | −190 | 205 |
| 3 B | −175 | 195 |
| 3 C | −165 | 181 |
| 3 D[1] | −160 | 249 |
| 3 E[1] | −150 | 207 |
| 3 F | [2]11.0 | 253 |
| 3 G | [2]15.6 | 260 |
| 3 H[1] | [2]8.1 | 235 |

[1]See Table 1
[2]$vE_{-196°}$ C. (kg. m./cm.).
Remarks: vTrs (° C.) is V-notch Charpy 50% ductile transition temperature. Other signs are of the same meaning as FIG. 1.

EXAMPLE 3

In Table 3 there are shown mechanical properties, particularly the toughness and strength, of about 3.0% Ni-containing hot-rolled steel plates manufactured by a conventional method, as subjected to the Q-treatment and the T-treatment with or without the L-treatment.

Figure 12:
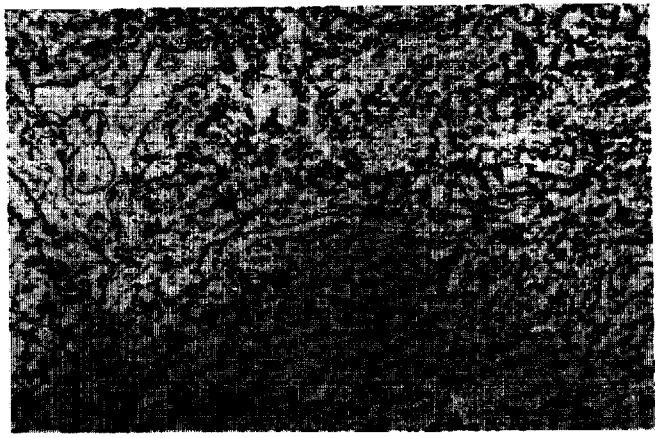
FIG. 12 is a photograph showing a structure by the servation with an electron microscope of a magnifiɜion of 4,500 [in the case where] *of* a 3%-Ni series t-rolled steel plate *which* is subjected to hardening d tempering treatments.
Figure 11:
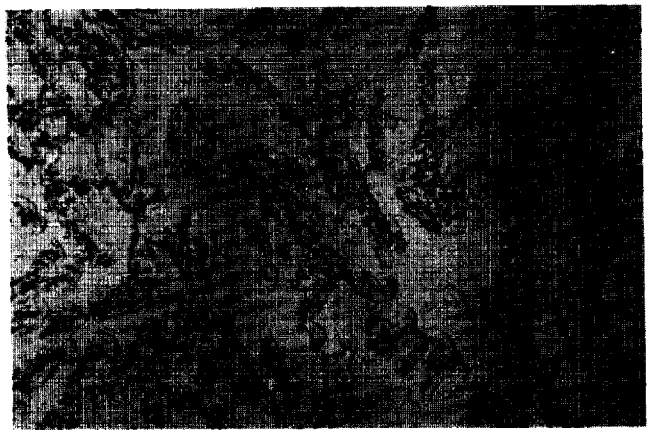
FIG. 11 is a photograph showing a structure by the servation with an electron microscope of a magnifiɜion of 4,500 [in the case where] *of* a 3%-Ni series t-rolled plate *which* is subjected to the heat-treatɜnt method of the present invention.

The samples Nos. 3A and 3C and Nos. 3F and 3G are the steels treated according to the method of the present invention, including the L-treatment, while the samples Nos. 3D, 3E and 3H are those treated [to] *by* a conventional method, wherein the L-treatment is not included. From the comparison of both groups it is clear that the steels of the present invention are far superior in the toughness [to] *as compared to that of* conventional steels. [That is,] *Thus*, in the steels treated according to the method of the present invention there is produced a very fine tempered structure, wherein cementite is finely precipitated in islands of the tempered martensite. Further, as the tempering of the ferrite matrix [is made] *makes* progress and there [are] *is* produced pure ferrite of fine grains which does not contain cementite, a structure having an excellent toughness can be obtained. FIG. 11 is a microphotograph of 4,500 magnifications of the final structure of the sample No. 3A, from which the above-mentioned fact is [manifested to be true] *apparent*. FIG. 12 is also a microphotograph of the final structure of the sample No. 3D which was not treated according to the method of the present invention, showing that a coarse cementite is being extensively precipitated, which establishe [d] *s* that the steel treated according to the method of the present invention is superior to the conventional steel.

As is above explained, [the] steel, heat-treated according to the method of the present invention, has an excellent toughness at low temperature without [being attended with a] reduction of the strength, *and* can be easily produced, because the optimum tempering temperature extends over a wide range and further *the steel* can be used for various purposes, as the workability at normal temperature is strikingly improved. However, the present invention is not limited to the examples above-mentioned, but may be modified variously within the scope of the objects of the present invention.

What is claimed is:

1. A heat-treating method for producing a steel having an excellent toughness at an extremely low temperature and [a] high strength and good workability, from a steel consisting essentially of less than 0.20 wt.% C [.], 0.05 to 0.40 wt.% Si, 0.10 to 5.0 wt.% Mn, 1.50 to 10.0 wt.% Ni as basic *alloying* component, *with the balance being Fe and the usual impurities*, comprising subjecting a hot-rolled steel plate having the said composition to a heat-treatment comprising heating to a temperature between the $Ac_1$ transformation point and the $Ac_3$ transformation point and a subsequent cooling from the said temperature at least at an air cooling rate and thereupon tempering the steel plate at a temperature below the $Ac_1$ transformation point [.] *but sufficiently high so as to cause precipitation or formation of fine austenite*.

2. A method according to claim 1, wherein the heat-treatment comprising the heating of the hot-rolled steel plate to a temperature between the $Ac_1$ transformation point and the $Ac_3$ transformation point and the subsequent cooling from the said temperature is carried out [repeatedly] more than one time.

3. A method according to claim 2, wherein prior to said heat-treatment, said hot-rolled steel plate is subjected to a solid solution treatment.

4. A heat-treating method for producing a steel having an excellent toughness at an extremely low temperature and [a] high strength and good workability from a steel consisting essentially of less than 0.20 wt.% C, 0.05 to 0.40 wt.% Si, 0.10 to 5.0 wt.% Mn, [to] 1.50 to 10.0 wt.% Ni as basic *alloying* components *with the balance being Fe and the usual impurities*, comprisng heating a hot-rolled steel plate having the said composition to a temperature below the austenite grain coarsing temperature *but* above the $Ac_3$ transformation point and subsequently cooling the steel plate from the said temperature at least at an air-cooling rate, then subjecting the steel plate to a heat-treatment comprising heating the steel plate to a temperature between the $Ac_1$ transformation point and the $Ac_3$ transformation point and subsequently cooling said steel plate from the said temperature at least at an air cooling rate and thereupon tempering the steel plate at a temperature below [.] *the $Ac_1$ transformation point but sufficiently high so as to cause precipitation or formation of fine austenite.*

5. A heat-treating method according to claim 4, wherein the heat-treatment comprising the heating of the steel plate to a temperature between the $Ac_1$ transformation point and the $Ac_3$ transformation point and the subsequent cooling from the said temperature at least at an air cooling rate is carried out [repeatedly] more than one time.

6. A heat-treating method according to claim 4, wherein said hot-rolled steel plate is subjected to a solid solution treatment prior to heating the steel plate to a temperature below the austenite grain coarsing temperature *but* above the $Ac_3$ transformation point and subsequently cooling the steel plate from the said temperature.

7. A method as claimed in claim 1 wherein said steel further comprises at least one element selected from the group consisting of 0.05 to 1.0 wt.% Mo, 0.1 to 2.0 wt.% Cu, 0.1 to 1.50 wt.% Cr, less than 1.0 wt.% Nb, less than 1.0 wt.% V and less than 0.05 wt.% sol. [Ao] *Al*, and the rest being Fe and unavoidable impurities.

8. A method as claimed in claim 4, wherein said steel further comprises at least one element selected from the group consisting of 0.05 to 1.0 wt.% Mo, 0.1 to 2.0 wt.% Cu, 0.1 to 1.50 wt.% Cr, less than 1.0 wt.% Nb, less than 1.0 wt.% V and less than 0.05 wt.% sol. Al and the rest being Fe and unavoidable impurities.

* * * * *